(12) United States Patent
Carter (10) Patent No.: US 6,801,623 B1
(45) Date of Patent: Oct. 5, 2004

(54) SOFTWARE CONFIGURABLE SIDETONE FOR COMPUTER TELEPHONY

(75) Inventor: George E. Carter, Santa Clara, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/442,421

(22) Filed: Nov. 17, 1999

(51) Int. Cl.$^7$ .............................................. H04M 9/00
(52) U.S. Cl. ...................................................... 379/391
(58) Field of Search ................................. 379/391, 392, 379/392.01, 399.01, 395, 400, 401, 402, 403, 404, 390.01, 390.03, 388.06, 413.02, 406.01, 416, 415

(56) References Cited

U.S. PATENT DOCUMENTS

| | | | |
|---|---|---|---|
| 3,892,924 A | 7/1975 | Vachon ................... | 179/15 BY |
| 4,081,620 A | 3/1978 | Goodman et al. ......... | 179/81 A |
| 4,445,002 A | 4/1984 | Terry ........................ | 179/81 A |
| 4,572,003 A | 2/1986 | Fritz ........................ | 73/861.18 |
| 4,879,738 A * | 11/1989 | Petro ............................. | 379/3 |
| 5,398,282 A | 3/1995 | Forrester et al. ............ | 379/391 |
| 5,467,394 A | 11/1995 | Walker et al. ............... | 379/392 |
| 5,487,102 A * | 1/1996 | Rothschild et al. ......... | 379/67.1 |
| 5,533,119 A | 7/1996 | Adair et al. ................. | 379/391 |
| 5,640,450 A | 6/1997 | Watanabe .................... | 379/392 |
| 5,649,008 A | 7/1997 | Bader et al. ................. | 379/392 |
| 5,790,532 A | 8/1998 | Sharma et al. | |
| 5,852,774 A | 12/1998 | Kropp ......................... | 455/403 |
| 5,893,034 A | 4/1999 | Hikuma et al. ............. | 455/501 |
| 6,148,077 A * | 11/2000 | Fullam et al. ............... | 379/387 |
| 6,151,391 A * | 11/2000 | Sherwood et al. .......... | 379/391 |

FOREIGN PATENT DOCUMENTS

| | | | |
|---|---|---|---|
| EP | 0 776 113 A2 | | 5/1997 |
| JP | 01270435 A | * | 10/1989 |
| JP | 04332237 | | 11/1992 |
| JP | 04332237 A | * | 11/1992 |
| JP | 09181817 | | 7/1997 |
| JP | 11-136347 | * | 5/1999 |

* cited by examiner

Primary Examiner—Rexford Barnie (57) ABSTRACT

Techniques for software configurable sidetone are provided. A user can select one or more characteristics of the sidetone and the sidetone signal will be generated according to an input signal and the user selected characteristic or characteristics. A bipartite calculation can be utilized to generate the sidetone such that the sidetone increases by a decreased percentage of the input signal above a threshold. Additionally, characteristics of multiple configurations can be stored in a configuration database for use with each configuration.

24 Claims, 10 Drawing Sheets

SOFTWARE CONFIGURABLE SIDETONE FOR COMPUTER TELEPHONY

BACKGROUND OF THE INVENTION

The present invention relates to audio systems. More particularly, the invention relates to software configurable sidetone for computer telephony systems.

In traditional telephones, sidetone refers to the signal that is received from the microphone in the handset and transmitted to the speaker in the handset. In other words, sidetone refers to the speaker's own voice that is propagated back to the speaker's ear. Without sidetone, it was found that people could not hear their own voice so they talked louder, sometimes yelling, so that they thought they could be heard even when they were actually being heard fine. With too high a sidetone volume, it was found that people heard their own voice at a high volume so they spoke quieter, sometimes whispering, so that they thought they would not sound so loud even when their speaking volume was actually fine in terms of reception at the other end.

Traditional telephones have circuits that provide sidetone feedback to people talking on the telephone because it facilitates proper voice amplitude and makes users more comfortable with the experience. However, as technology advances, computer systems and telephone systems are being integrated. This is especially true for next generation telephone systems that include packet-switched transport in addition to the traditional circuit-switched transport.

A traditional telephone can be incorporated into a computer telephony system in order to utilize the known hardware techniques (such as the partially unbalanced hybrid) to generate appropriate sidetone. However, incorporating personal computer clients in the next generation telephone systems will increase the number of audio transducers that can be used beyond traditional telephones.

Computer systems can utilize microphones, speakers, headsets, handsets, auxiliary input, auxiliary output, and the like for computer telephony. These transducers may not incorporate a hardware sidetone generator, may not operate at the same levels of traditional telephones, and may not operate at the same level as any of the other transducers. For these reasons, and others, conventional hardware sidetone techniques are not satisfactory.

Some sound cards may allow a user to "mute" a microphone so that its output will not be transmitted to the output transducers, such as speakers. However, this only allows the user to disable sidetone altogether or to enable an unattenuated, full volume sidetone that is typically too loud for computer telephone user.

It would be desirable to have software configurable sidetone for the additional transducers that are available with computer telephony. Additionally, it would be desirable to have techniques of customizing the sidetone, not only for a specific user but also for each configuration of the computer telephony. Moreover, it would be desirable to have techniques of customizing the sidetone in a more complex fashion that is practical with current hardware techniques in order to better optimize the user-telephony interface.

SUMMARY OF THE INVENTION

The present invention provides innovative techniques for software configurable sidetone for computer telephony. A user can specify a characteristic of the desired sidetone and then the computer system generates the sidetone signal with the specified characteristic. An example of a characteristic is the overall volume of the sidetone. Another example of a characteristic is an adjustment of ratios, thresholds and/or parameters that are utilized by the computer system to generate the sidetone signal. Additionally, sidetone can be customized for different configurations of the computer telephony system. Several embodiments of the invention are described below.

In one embodiment, the invention provides a computer implemented method of generating a sidetone signal. An input signal from an input transducer is received. A sidetone signal according to the input signal and a user defined characteristic is generated. In a preferred embodiment, the volume of the sidetone signal is proportional to the volume of the input signal at a first ratio when the volume of the input signal is below a threshold, and the volume of the sidetone signal is proportional to the volume of the input signal at a second ratio when the volume of the input signal is above the threshold.

In another embodiment, the invention provides a computer implemented method of generating a sidetone signal. A current value of a characteristic of a sidetone signal is displayed. User input specifying a new value of the characteristic of the sidetone signal is received. The new value of the characteristic for generating the sidetone signal is saved. When the sidetone signal is generated, the sidetone signal can be generated according to an input signal from an input transducer and the new value of the characteristic.

Other features and advantages of the invention will become readily apparent upon the review of the following description in association with the accompanying drawings. In the drawings, the same or similar structures will be identified by the same reference numerals.

DETAILED DESCRIPTION OF EMBODIMENTS

In the description that follows, the present invention will be described in reference to embodiments that allow users to configure one or more characteristics of the desired sidetone through software in a computer telephony system. More specifically, the embodiments will be described in reference to a preferred embodiment that works in conjunction with a sound card that allows configurations for multiple audio transducers in the computer telephony system. However, the invention is not limited to the specific audio devices, implementations or architecture described herein as the invention can be implemented in different ways. Therefore, the description of the embodiments that follows for purposes of illustration and not limitation.

Figure 1:
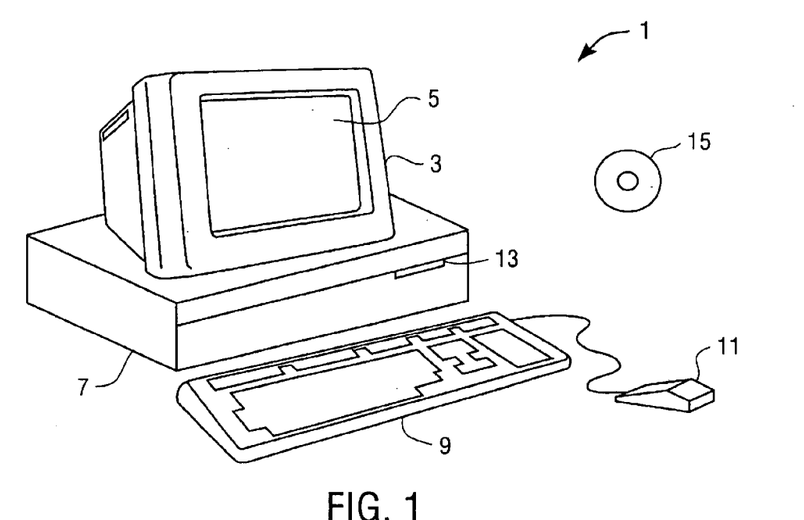
FIG. 1 illustrates an example of a computer system that can be utilized to execute the software of an embodiment of the invention and use hardware embodiments.

FIG. 1 illustrates an example of a computer system that can be used to execute the software of an embodiment of the invention and use hardware embodiments. FIG. 1 shows a computer system 1 that includes a display 3, screen 5, cabinet 7, keyboard 9, and mouse 11. Mouse 11 can have one or more buttons for interacting with a GUI. Cabinet 7 houses a CD-ROM drive 13, system memory and a hard drive (see FIG. 2) which can be utilized to store and retrieve software programs incorporating computer code that implements aspects of the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 2:
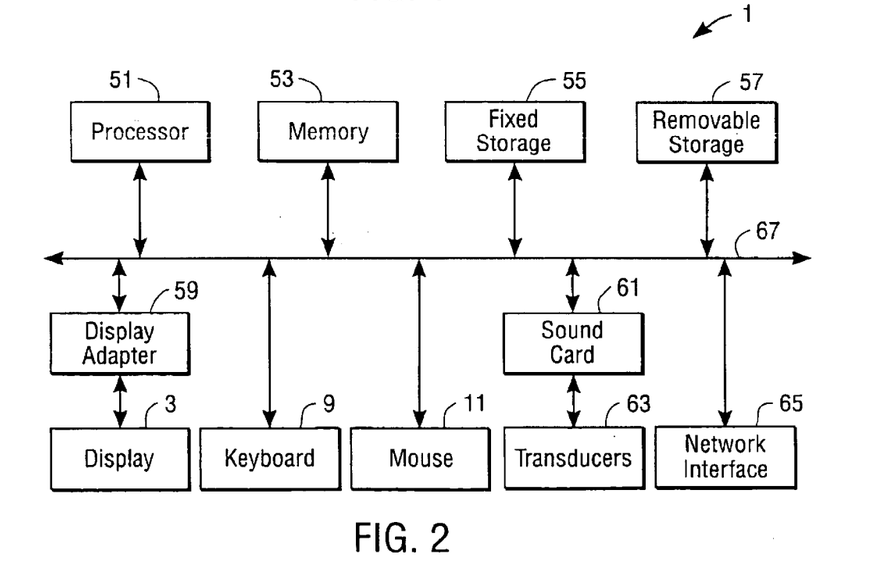
FIG. 2 illustrates a system block diagram of the computer system of FIG. 1.

FIG. 2 shows a system block diagram of computer system 1 used to execute a software of an embodiment of the invention or use hardware embodiments. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, transducers 63 (speakers, microphones, and the like), and network interface 65. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems can also be utilized.

In telephony conversations, there is typically a near-end microphone or sounds ("near" relative to a person) and a far-end microphone or sounds ("far" relative to the person). These terms are relative to the person so the terms will change depending on the person that is referenced. In traditional telephones, the far-end sounds are mixed with the attenuated near-end sounds (i.e., the sidetone) and are output through a near-end speaker in the handset.

Figure 3:
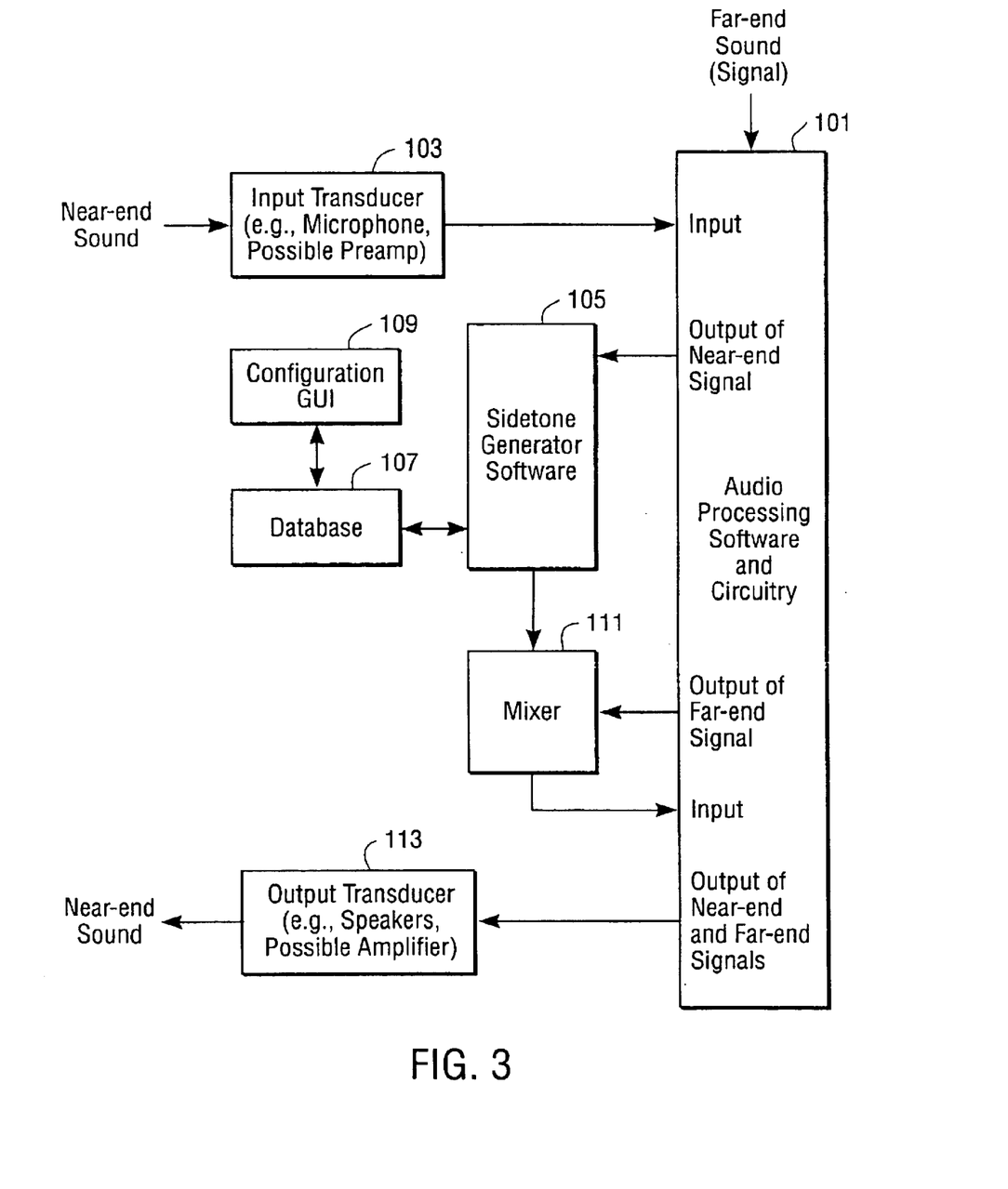
FIG. 3 shows a block diagram of an embodiment of the invention that provides software configurable sidetone.

FIG. 3 shows a block diagram of an embodiment of the invention. A signal corresponding to far-end sound is input to an audio processing software and circuitry 101. The audio processing can, among other things, adjust the level of the signal before it is output. Near-end sound is received by an input transducer 103 and transformed into a near-end sound signal that is digitized and amplified by audio processing software and circuitry 101.

Sidetone generator software 105 receives the near-end sound signal and attenuates it to produce a sidetone signal according to at least one characteristic stored in a configuration database 107. An example of a stored characteristic is the overall volume of the sidetone (see, e.g., FIG. 6A), but there can be other stored characteristics as will be described in more detail below. The characteristics in configuration database 107 can be entered and modified by a user through a configuration graphical user interface (GUI) 109. Configuration database 107 can store characteristics for multiple users, multiple audio transducers and multiple telephony configurations.

The processed far-end signal and the sidetone signal are mixed by an audio mixer 111. The mixed signal is then fed back into audio processing software and circuitry 101 and finally transmitted to an output transducer 113. Output transducer 113 then produces the near-end sounds. Since most of the time only one person is talking, the near-end sounds are often only one person's voice; however, when both people talk at the same time, the near-end sounds can include both people's voices. As shown, the input and output transducers can optionally include amplifiers.

Figure 4:
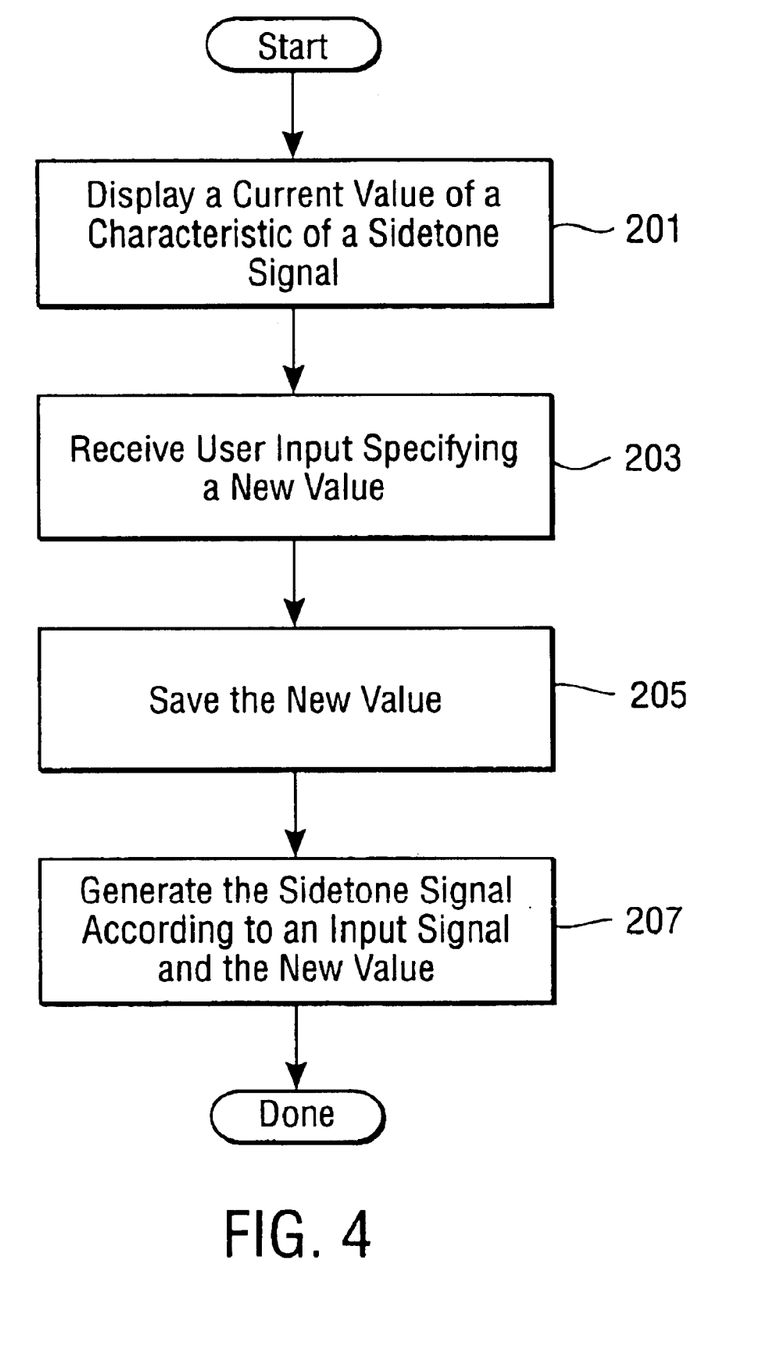
FIG. 4 shows a flow chart of a process that generates a sidetone signal based on a user defined characteristic of the sidetone.

FIG. 4 is a flow chart of a process that can be executed by sidetone generator software 105. At a step 201, a current value of a characteristic of a sidetone signal is displayed. Through configuration GUI 109, user input specifying a new value for the characteristic of the sidetone signal can be received at a step 203. At a step 205, the new value is saved in configuration database 107. Alternatively, the user can elect to bypass this sidetone adjustment and user preconfigured default values.

At a step 207, the sidetone signal is generated according to an input signal and the new value (and potentially other configuration parameter). The input signal is the signal from the near-end device to be attenuated (or possibly amplified) in order to produce the sidetone signal. In order to illustrate the invention, the invention has been described in reference to the blocks in FIG. 3. However, the invention is not limited to any specified design or architecture. Furthermore, steps in the flow charts can be added, deleted, reordered, and combined without departing from the spirit and scope of the invention.

Figure 5:
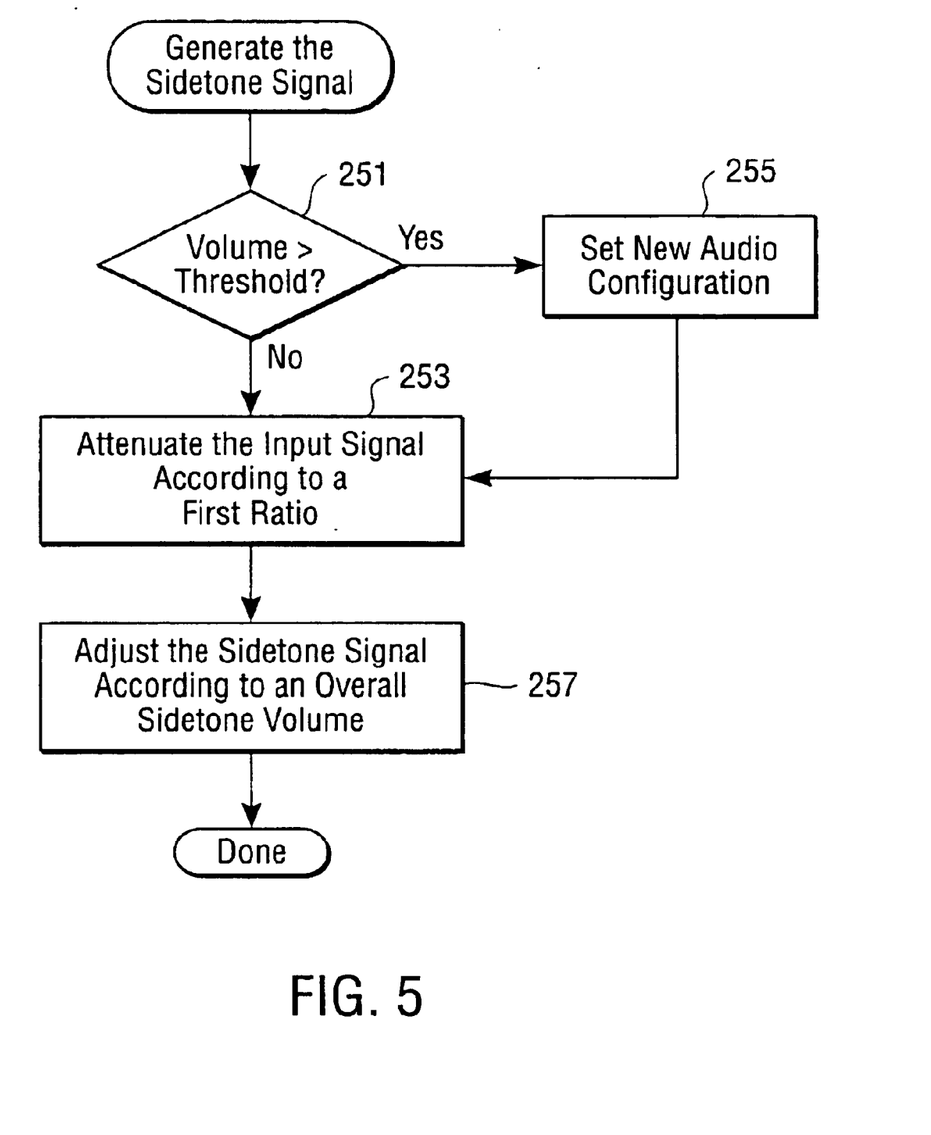
FIG. 5 shows a flow chart of a process that generates a sidetone signal that is attenuated at one ratio under a threshold and another ratio above the threshold.

FIG. 5 is a flow chart of a process of generating the sidetone signal (see, e.g., step 207 of FIG. 4). At a step 251, it is determined if the volume (e.g., amplitude) of the input signal is greater than a threshold. If the volume is less than the threshold, the input signal is attenuated according to a first ratio, which creates a sidetone signal that is proportional to the input signal by the first ratio. If the volume is greater than (or equal to) the threshold, the input signal is attenuated according to a second ratio, which creates a sidetone signal that is proportional to the input signal by the second ratio. In preferred embodiments, the first ratio is greater than the second ratio so that at relatively high volumes, the input signal is attenuated more. Thus, above a transition point, the sidetone volume increases with a decreased percentage.

At a step 257, the sidetone signal is adjusted according to an overall sidetone volume. Although FIG. 5 shows the utilization of both a bipartite sidetone signal calculation and an overall sidetone volume, some embodiments utilize each separately. The first ratio, second ratio, threshold, and overall sidetone volume are examples of characteristics that can be stored and utilized to generate the sidetone signals. Additionally, a bipartite sidetone signal calculation has been described but two or more thresholds (tri and up) can be utilized by an extension of the principles described herein.

Also, other formulas can be utilized to generate the desired sidetone signal curve.

Existing media interfaces, such as the Wav and DirectX interfaces of the Windows operating system, typically make the microphone input signal and the speaker output signal available in the time domain. Let us assume that the amplitude of a sample of our signal is equal to a variable called "x." Also assume the threshold, first ratio and second ratios are represented by variables "a," "b" and "c," respectively. With these definitions, the following can be utilized to generate the sidetone "sidetone_output":

If $x<a$ then sidetone_output=$xb$

If $x>=a$ then sidetone_output=$ab+(x-a)c$

With the present invention, manufacturers can sell or license software and/or hardware that come with default sidetone capability for use in computer telephony. The default sidetone settings can be designed to work with what is believed to be the most common configuration. Accordingly, for many users, comfortable sidetone will be provided by the default sidetone settings after installation of the product incorporating the invention. Additionally, some embodiments provide users with the capability to customize the generated sidetone to suit their hardware configuration, personal preferences, and the like.

Figure 6A:
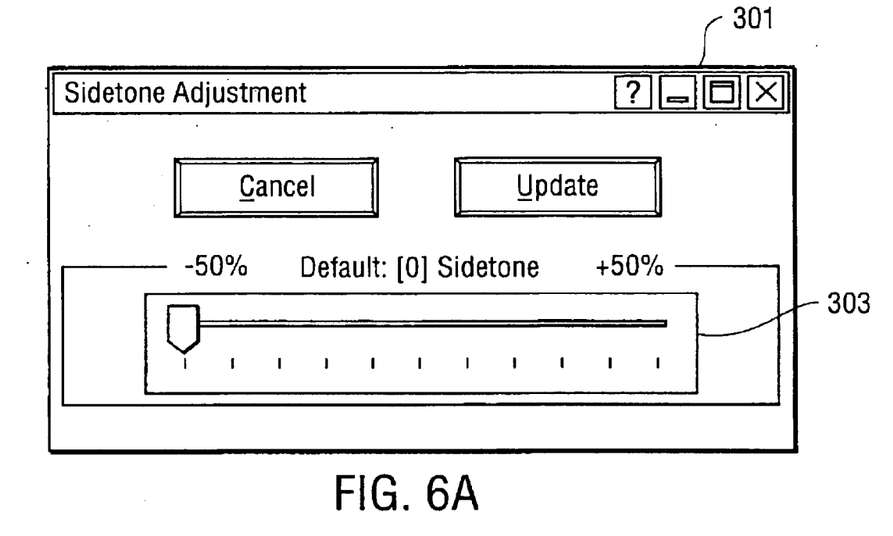
FIGS. 6A and 6B show examples of GUI windows that allow users to configure one or more characteristics of the generated sidetone.

FIG. 6A shows an example of a GUI window 301 in which a user can adjust the overall sidetone volume. In window 301, a user can adjust the overall sidetone volume by manipulating a slider bar 303. The slider bar is shown as adjusting the overall sidetone volume by +/-50%. Other GUI objects can be utilized in addition to slider bars including buttons, check boxes, pull down menus, direct entry, and the like.

Figure 6B:
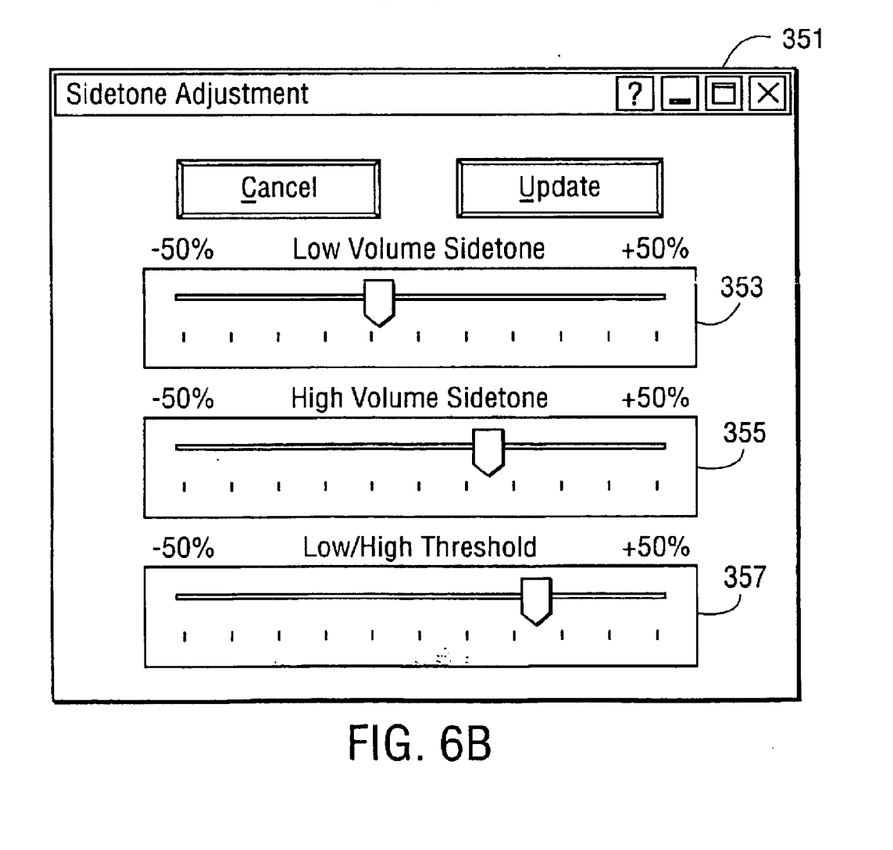

FIG. 6B shows an example of a GUI window 351 in which a user can adjust the first ratio, second ratio, and the threshold. In a window 351, a user can adjust the first ratio using a slider bar 353, the second ratio using a slider bar 355, and the threshold using a slider bar 357. For easier understanding to the user, the slider bars are labeled "Low Volume Sidetone," "High Volume Sidetone" and "Low/High Threshold," respectively.

Figure 7:
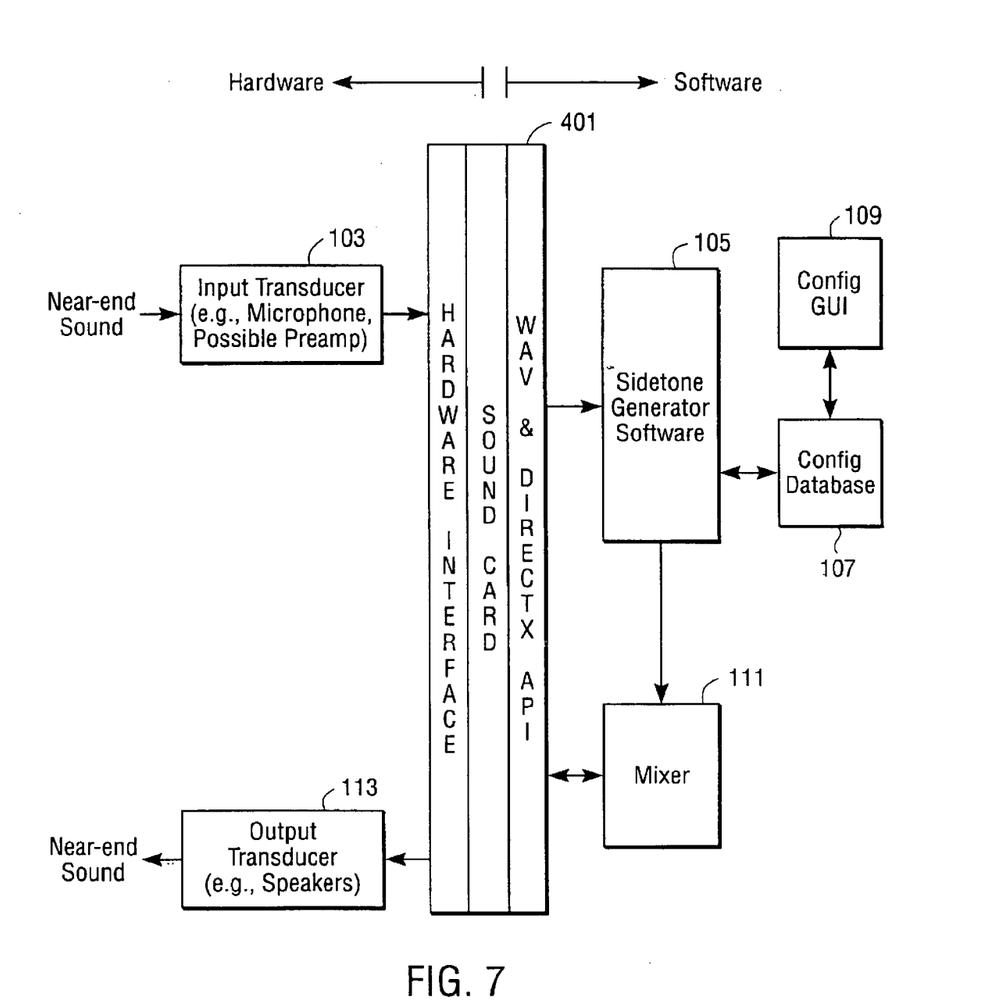
FIG. 7 shows a block diagram of an embodiment illustrating the components implemented in hardware and the components implemented in software.

Now that embodiments of the invention have been described in detail, it may be beneficial to distinguish the hardware and software components of FIG. 3. FIG. 7 shows how one embodiment can be implemented in both hardware and software. Input and output transducers 103 and 113 are hardware, such as microphones. A sound card 401 includes both a hardware board and software drivers so it is shown as both being implemented in hardware and software. Sidetone generator software 105, configuration database 107, configuration GUI 109, and mixer 111 are shown as being implemented in software.

In some embodiments, the invention is implemented utilizing an audio transducer switch as described in commonly owned application Ser. No. 09/314,615 filed May 19, 1999, which is hereby incorporated by reference. The following will describe some of the aspects of the audio transducer switch.

Figure 8A:
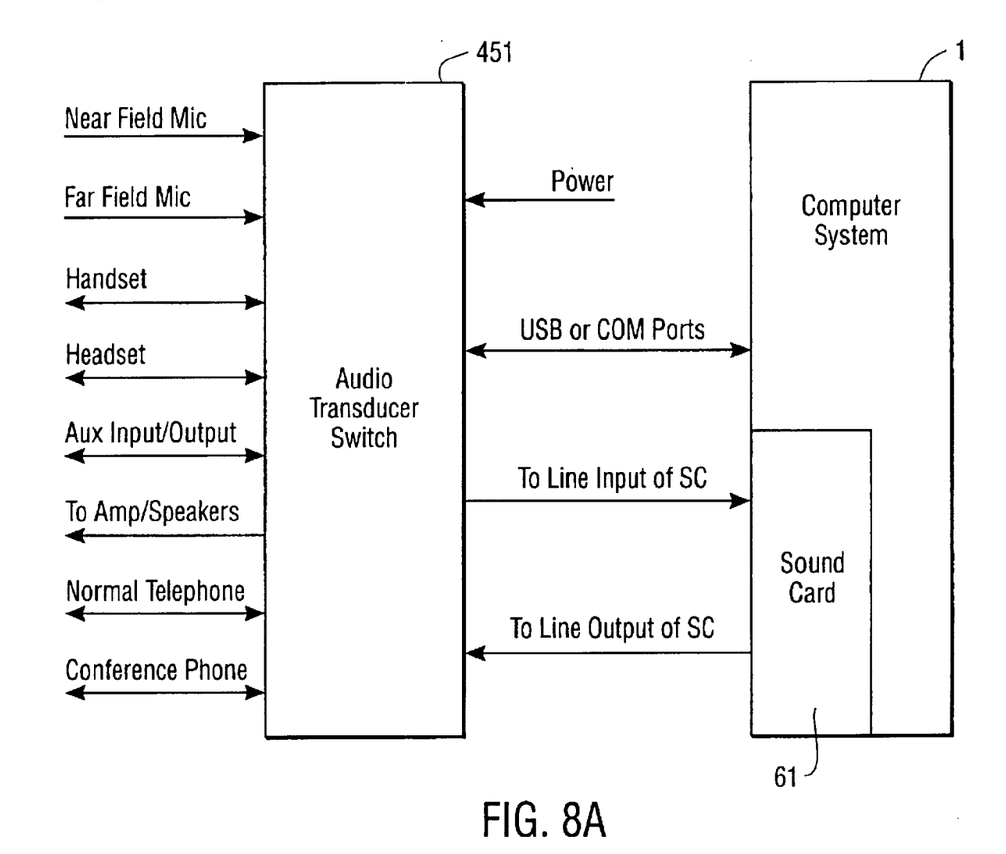
FIGS. 8A and 8B show embodiments of systems that utilize an audio transducer switch to allow a computer telephony system to access and utilize multiple audio transducers.

FIG. 8A shows a system that utilizes an audio transducer switch to configure and use multiple audio transducers. As shown, computer system 1 includes sound card 61. The input and output ports or channels of sound card 61 are connected to an audio transducer switch 451. Audio transducer switch 451 is shown connected to multiple audio transducers including a near-field microphone, a far-field microphone, a handset, a headset, an auxiliary input/output, speakers (possibly including an amplifier), a normal telephone, and a conference telephone. The audio transducer switch can be connected to more or fewer audio transducers but the audio transducers shown represent a reasonable number and variation of audio transducers for illustrating the audio transducer switch.

Audio transducer switch 451 is an intermediary device between the audio transducers and computer system 1. The audio transducer switch determines which one or ones of the audio transducers will be electrically connected to the input and output ports of sound cards 61. In order to allow user configuration of the audio transducers, computer system 1 can communicate with audio transducer switch 451 through a different port or channel, such as a universal serial bus (USB) or serial COM port.

Figure 8B:
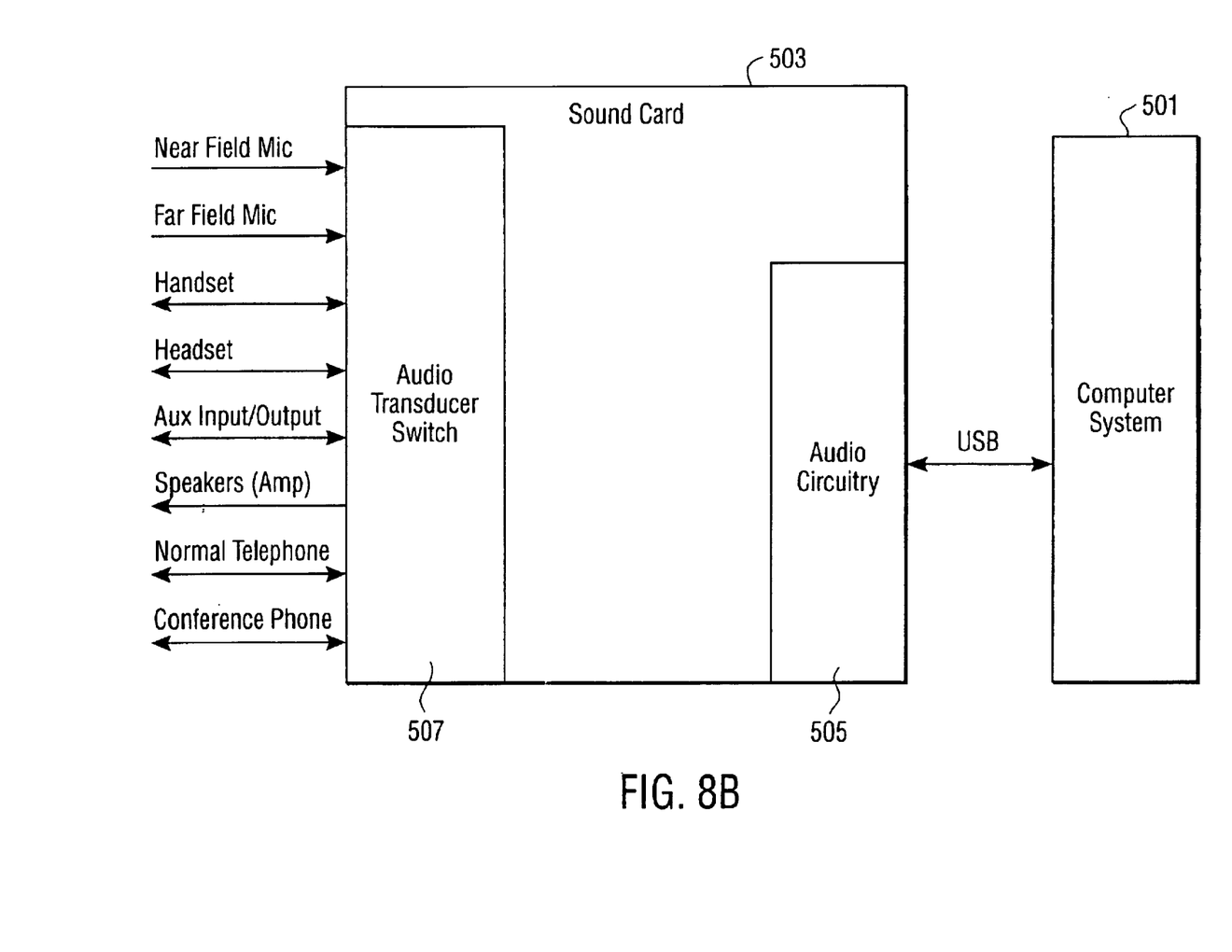

FIG. 8B shows an embodiment of an audio transducer switch on an external sound card. A computer system 501 communicates with an external sound card 503 through a channel such as a USB. As shown, sound card 503 includes audio circuitry 505 and an audio transducer switch 507. Audio circuitry 505 is generally responsible for converting analog audio signals to digital audio signals that are transmitted to computer system 501, and vice versa.

Figure 9:
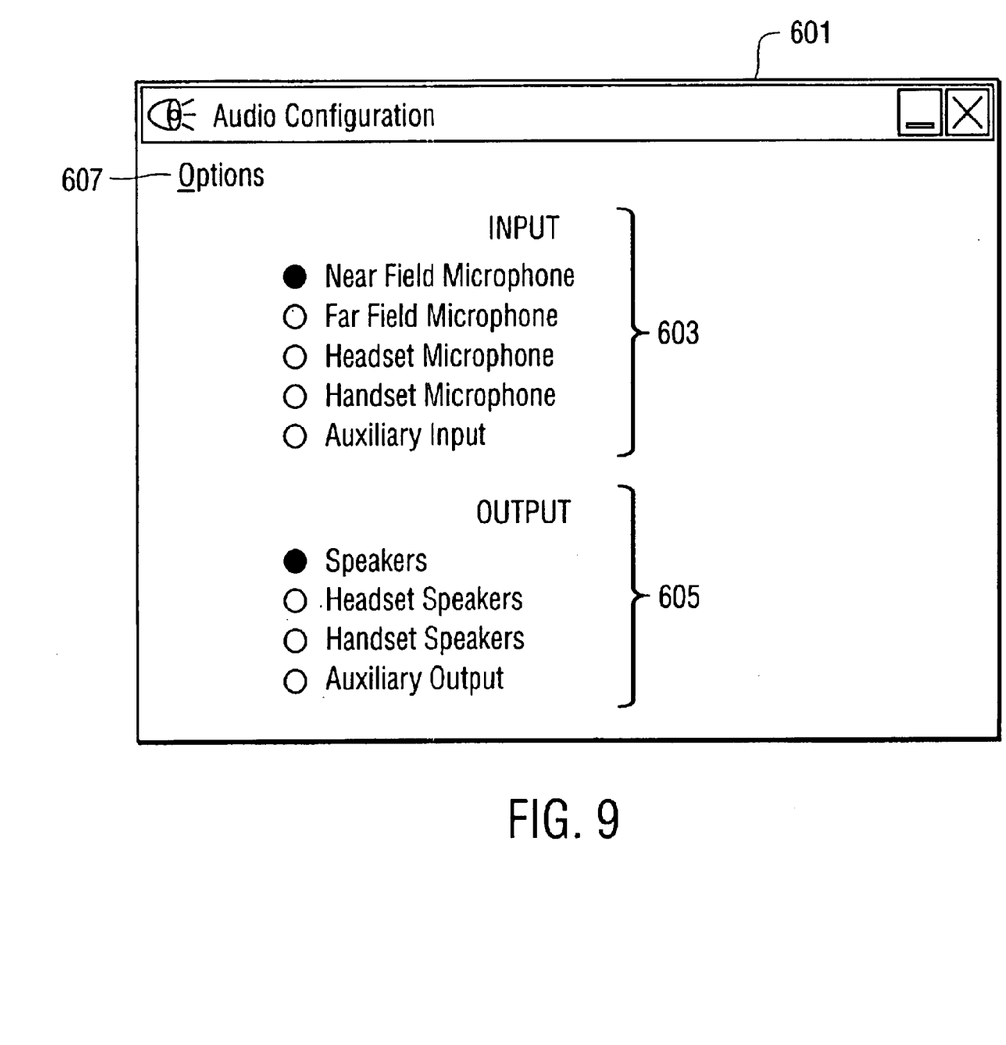
FIG. 9 shows examples of GUI windows that allow a user to select the configuration of multiple audio transducers.

In either embodiment shown in FIGS. 8A and 8B, the audio transducer switch is electrically coupled between the audio circuitry and the multiple audio transducers. The audio transducer switch is controlled to allow use of one of more of the audio transducers, which can be thought of as a computer telephony configuration. For example, FIG. 9 shows a GUI window 601 where a user can select input and/or output transducers to define a configuration.

Window 601 includes an input section 603 and an output section 605. Each section includes "radio" GUI objects that allow a user to select one input or output device from the displayed choices to be used in the current audio configuration. In some embodiments, once one input or output transducer is selected, the computer system will automatically select a corresponding default input or output transducer. However, the radio GUI objects can be utilized by the user to override default configurations.

As shown, the current configuration is for the near-field microphone as the input audio transducer and the speakers as the output audio transducer. A pull down menu 607 can be utilized to set the default audio transducers and defaults for corresponding input and output devices. Additionally, pull down menu 607 can be utilized to specify one or more characteristics of the sidetone generated for the specified configuration, which can be stored in the configuration database. In other embodiments, characteristics for individual users and/or audio configurations can be stored in the configuration database. Thus, users can have great flexibility in not only selecting an audio configuration, but also having the sidetone automatically selected for that configuration.

Figure 10:
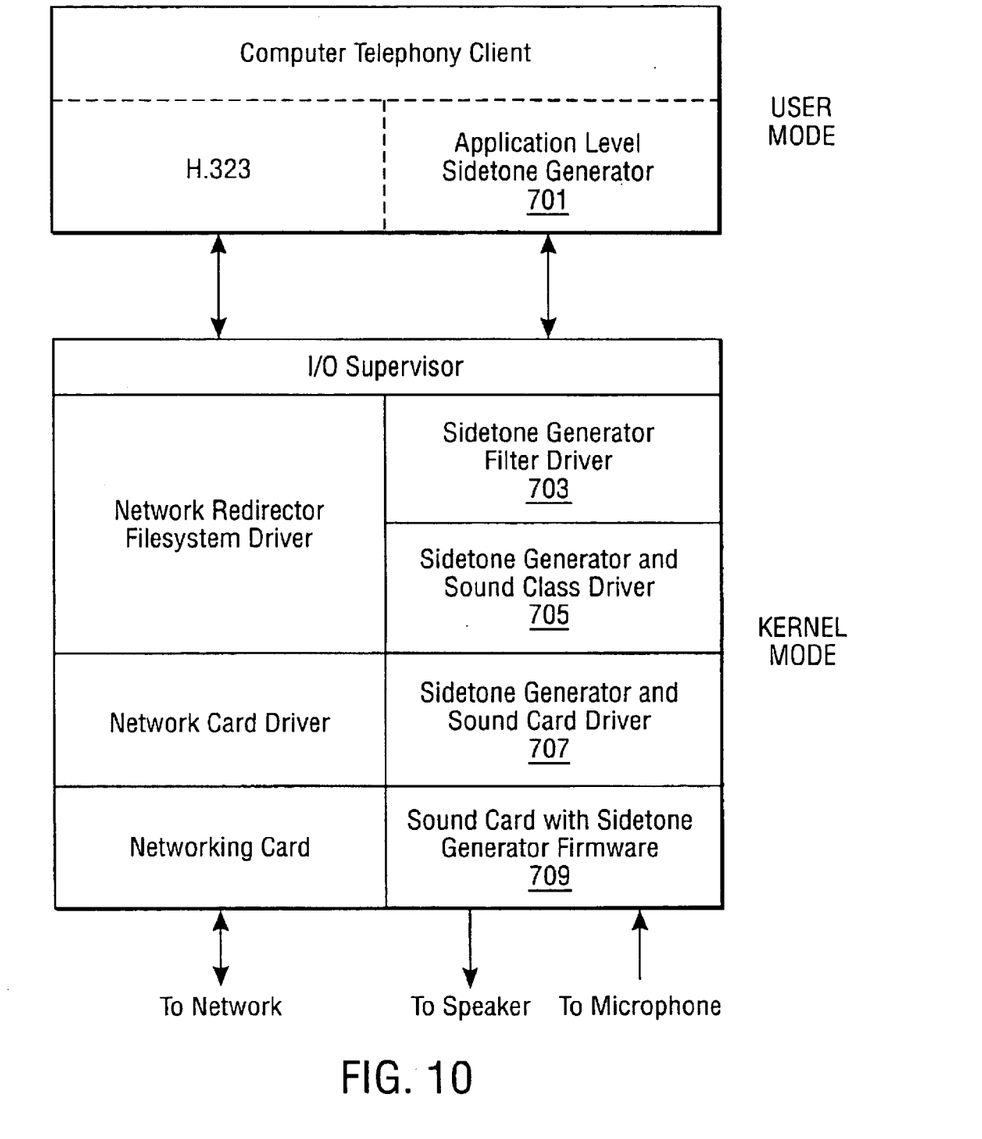
FIG. 10 shows a diagram of different layers at which the invention can be utilized.

The above has described the invention as being implemented in user mode, at the application level, interfacing with the standard audio programming interfaces such as Wav and DirectX interfaces. FIG. 10 shows different levels in which the present invention can be implemented. As shown, the invention can be implemented in software at an application level (as seen by 701), filter driver level (as seen by 703), sound class driver (as seen by 705), or sound card driver (as seen by 707). Additionally, the invention can be implemented in hardware, such as in sidetone generator firmware (as seen by 709) on a sound card.

While the above is a complete description of exemplary embodiments of the invention, various alternatives, modifications and equivalents can be used. It should be evident that the invention is equally applicable by making appropriate modifications to the embodiments described above. Therefore, the above description should not be taken as limiting the scope of the invention that is defined by the metes and bounds of the following claims along with their full scope of equivalents.

What is claimed is:

1. A computer implemented method of generating a sidetone signal, comprising:
   receiving an input signal from an input transducer; and
   generating a sidetone signal according to the input signal and a user defined characteristic, wherein the user defined characteristic is a ratio in which a volume of the sidetone signal is proportional to a volume of the input signal.

2. The method of claim 1, wherein the volume of the sidetone signal is proportional at a first ratio to the volume of the input signal when the volume of the input signal is below a threshold and the volume of the sidetone signal is proportional at a second ratio to the volume of the input signal when the volume of the input signal is above the threshold.

3. The method of claim 2, wherein the first ratio is greater than the second ratio.

4. The method of claim 2, further comprising user defined characteristics of the first ratio and second ratio.

5. The method of claim 1, further comprising selecting the user desired characteristic from a plurality of user defined characteristics according to the input transducer.

6. The method of claim 1, further comprising storing user desired characteristics for a plurality of input transducers in a database.

7. The method of claim 1, wherein the input transducer is a near field microphone, far field microphone, headset microphone, handset microphone, auxiliary input, normal telephone microphone, or conference telephone microphone.

8. A computer program product that generates a sidetone signal, comprising:
   computer code that receives an input signal from an input transducer;
   computer code that generates a sidetone signal according to the input signal and a user defined characteristic, wherein the user defined characteristic is a ratio in which a volume of the sidetone signal is proportional to a volume of the input signal; and
   a computer readable medium that stores the computer codes.

9. The computer program product of claim 8, wherein the computer readable medium is a CD-ROM, floppy disk, tape, flash memory, system memory, hard drive, or a data signal embodied in a carrier wave.

10. A system, comprising:
    a processor; and
    a computer readable medium storing a computer program including computer code that receives an input signal from an input transducer; and computer code that generates a sidetone signal according to the input signal and a user defined characteristic, wherein the user defined characteristic is a ratio in which a volume of the sidetone signal is proportional to a volume of the input signal.

11. The system of claim 10, wherein the computer readable medium is a CD-ROM, floppy disk, tape, flash memory, system memory, hard drive, or a data signal embodied in a carrier wave.

12. A computer implemented method of generating a sidetone signal, comprising:
    displaying a current value of a characteristic of a sidetone signal, wherein the characteristic is a ratio in which a volume of the sidetone signal is proportional to a volume of an input signal from an input transducer;
    receiving user input specifying a new value of the characteristic of the sidetone signal; and
    saving the new value of the characteristic for generating the sidetone signal.

13. The method of claim 12, further comprising generating the sidetone signal according to the input signal from the an input transducer and the new value of the characteristic.

14. The method of claim 12, wherein the volume of the sidetone signal is proportional at a first ratio to the volume of the input signal from the input transducer when the volume of the input signal is below a threshold and the volume of the sidetone signal is proportional at a second ratio to the volume of the input signal when the volume of the input signal is above the threshold.

15. The method of claim 14, wherein the first ratio is greater than the second ratio.

16. The method of claim 14, further comprising characteristics of the first ratio and second ratio.

17. The method of claim 12, further comprising selecting the current value of the characteristic from a plurality of values according to a current input transducer.

18. The method of claim 17, further comprising receiving user input specifying the current input transducer from a plurality of input transducers.

19. The method of claim 12, further comprising storing current values for characteristics for a plurality of input transducers in a database.

20. The method of claim 12, wherein the input transducer is a near field microphone, far field microphone, headset microphone, handset microphone, auxiliary input, normal telephone microphone, or conference telephone microphone.

21. A computer program product that generates a sidetone signal, comprising:
    computer code that displays a current value of a characteristic of a sidetone signal, wherein the characteristic is a ratio in which a volume of the sidetone signal is proportional to a volume of an input signal from an input transducer;
    computer code that receives user input specifying a new value of the characteristic of the sidetone signal;
    computer code that saves the new value of the characteristic for generating the sidetone signal; and
    a computer readable medium that stores the computer codes.

22. The computer program product of claim 21, wherein the computer readable medium is a CD-ROM, floppy disk, tape, flash memory, system memory, hard drive, or a data signal embodied in a carrier wave.

23. A system, comprising:
    a processor; and
    a computer readable medium storing a computer program including computer code that displays a current value of a characteristic of a sidetone signal, wherein the characteristic is a ratio in which a volume of the sidetone signal is proportional to a volume of an input signal from an input transducer; computer code that receives user input specifying a new value of the characteristic of the sidetone signal; and computer code that saves the new value of the characteristic for generating the sidetone signal.

24. The system of claim 23, wherein the computer readable medium is a CD-ROM, floppy disk, tape, flash memory, system memory, hard drive, or a data signal embodied in a carrier wave.

* * * * *